United States Patent Office 3,326,860
Patented June 20, 1967

3,326,860
POLYESTER RESIN COMPOSITION
Walter E. Kramer, Niles, Ill., Louis A. Joo, Johnson City, Tenn., and Theodore H. Szawlowski, Wonder Lake, Ill., assignors, by mesne assignments, to Union Oil Company of California, Los Angeles, Calif., a corporation of California
No Drawing. Filed Dec. 4, 1962, Ser. No. 242,076
3 Claims. (Cl. 260—75)

This invention relates to novel polyesters capable of cross-linking (or thermosetting) either directly through double or triple bonds in the polyester chains by homo-polymerization or by means of ultra-violet light or through a double bond or active site of a monomer such as styrene by copolymerization or cross-linking and to compositions and products containing such complex polyesters. The polyester resins of this invention are distinguished from the prior art polyester resins in that a portion of the organic acids used in their preparation are complex di- and polycarboxylic acids derived from sulfur-containing aromatic compounds of petroleum origin by metalation, carbonation and acidification. A feature of this invention is the discovery that polyester resins so prepared, whether homopolymerized, or cross-linked at points of unsaturation with a polymerizable monomer, have properties making them particularly suitable as encapsulating, caulking, sealing and coating compositions because of their resistance to moisture and air, sound deadening qualities, ease of formation, low cost, resistance to aging, resistance to heat, inertness to dielectric materials, lack of the tendency to "cold flow," and resistance to chemical attack and superior tensile strength.

Another feature of this invention is the discovery that the mixed complex mono-, di- and polycarboxylic acids formed by metalation, carbonation and acidification of certain sulfur-containing aromatic compounds of petroleum origin, of the group consisting of (1) solvent extracts obtained in the solvent extraction of mineral lubricating oils using a solvent selective for aromatic compounds, i.e. phenol extracts, (2) hydrogenated or otherwise refined solvent extracts and (3) FCC recycle stock, decant oil, and their mixtures, when esterified by reaction with dibasic acids, alcohols and glycols, or polyols, at least one of which is unsaturated (thus being at least di-functional in nature), form, when homo-polymerized or cross-linked with a monomer, polyester resins that are highly suitable as transformer-encapsulating compositions, caulking and sealing compositions, clay pipe-joint sealants and potting compositions. The products of this invention find use in a wide variety of other applications because of their peculiar and highly desirable properties attributed to the presence therein of the novel complex polycyclic acids derived from sulfur-containing aromatic compounds of petroleum origin.

Accordingly, an object of this invention is to provide novel polymerized polyester resins.

An object of this invention is to provide a method of preparing novel polymerized polyester resins.

An object of this invention is to provide novel polymerized and/or cross-linked polyester resins.

Another object of this invention is to provide a method of preparing novel polymerized and/or cross-linked polyester resins.

Still another object of this invention is to provide improved sealing, caulking and encapsulating compositions.

A further object of this invention is to provide superior transformer-encapsulating compositions.

Another object is to provide novel-resin-filler compositions for use as sealing compositions, clay-pipe-joint compounds and potting compositions.

Another object of this invention is to provide transformer-encapsulating compositions containing certain unsaturated polyester resins and inert solids.

Another object of this invention is to provide potting compounds for use in ballast boxes of fluorescent lighting fixtures and other electrical applications which comprise about 20 to 50% by wt. of the novel polyester resins described herein with about 50 to 80% by weight of an inorganic or inert filler.

These and other objects will be described or become apparent as the specification proceeds.

Asphalt is the most commonly used potting compound in the encapsulation of transformers and other electrical components in assemblies such as the ballast boxes of fluorescent lights. The many deficiencies of asphalt for this purpose are discussed below; the novel encapsulating compositions disclosed herein are devoid of the shortcomings of asphalt in such use. Potting compounds are commonly used in ballast boxes of fluorescent lights, and in other electrical assemblies containing transformers and other components, to deaden sound, protect the components from moisture and air, etc. Asphalt is used almost universally for this purpose at the present time, primarily because of its low cost, but it has many deficiencies.

First, the encapsulated assemblies must be baked after the asphalt has been poured into them, in order to make certain that all of the parts have been covered and protected by the asphalt. Perhaps of even greater importance, the asphalt deteriorates with age. For example, the ballast boxes of fluorescent lights usually are mounted in spaces where heat dissipation is poor; this causes the asphalt to become warm and flow from the box, causing considerable damage. Then, too, the asphalt tends to harden and crack with age, exposing the encapsulated electrical components to attack by air and/or moisture.

Furthermore, the sound absorption ability of the asphalt diminishes greatly as it hardens, and the ballast boxes develop an undesirable amount of hum. And still further, the chlorinated diphenyl which is used as the dielectric in the paper condensers contained in the ballast boxes can cause the asphalt to flow from within the case.

Likewise asphalt, polyvinyl chloride, and unsaturated polyesters have been used heretofore as sealants for the joints of clay pipes, but they have had certain chemical and physical deficiencies, or have been too expensive. The compositions disclosed herein are substantially free of the deficiencies of the prior art sealants, are appreciably less costly and are more enduring than the prior art sealants.

The ceramic, clay pipe and tile industry is faced with the problem of providing more effective sealants for the joints of tile lines laid underground. Asphalt and polyvinyl chloride have been used in the past, primarily because of low cost, but they tend to "cold flow," they eventually become hard and brittle, and their resistance against chemical attack is low. Consequently, more recently resort has been to the use of unsaturated polyesters, prepared by reacting relatively pure saturated and unsatured dibasic acids or anhydrides, such as phthalic anhydride, with glycols and an unsaturated polymerizable solvent. The polyester compositions usually are filled with an inexpensive, inert, particulate solid. But, while these more recent sealants have been found to possess characteristics superior to the earlier sealants, they are sufficiently more expensive to be relatively unattractive for large-scale use.

THE POLYESTERS OF THIS INVENTION

Because of the complexity of the starting materials, namely the sulfur-containing aromatic compounds of petroleum origin, used to prepare the acids, the necessity of a complete description of the method of preparation of the acids, and the complexity of the reactions involved in preparing the polyesters therefrom, the description herein will depend in part on a series of related copending applications filed by the instant inventors and others which disclose in more detail the essential ingredients of the compositions of this invention and also disclose other characteristics, methods, uses and compositions containing or derived from the novel complex acids. Accordingly, whenever a copending application is referred to herein the parts thereof that are omitted from this specification are incorporated by reference for purposes of adequacy of disclosure.

Briefly the polyesters used in accordance with this invention are prepared by reacting the following ingredients in accordance with this outline:

(1) Reacting mixed complex mono-, di-, and polycarboxylic acids derived from sulfur-containing aromatic compounds of petroleum origin by metalation, carbonation and acidification with an unsaturated dibasic acid and an alcohol or a glycol or polyol or mixture of alcohols, glycols and polyols under esterification conditions and causing the resulting polyester to self-polymerize or reacting the polyester with a polymerizable monomer, in the presence of a polymerization initiator and polymerization promoter.

(2) Reacting selected fractions of said complex carboxylic acids predominating in acids containing two or more and up to seven carboxyl groups per molecule with an unsaturated dibasic acid and an alcohol or a glycol or polyol or mixture of alcohols, glycols and polyols under esterification conditions and causing the resulting polyester to self-polymerize or reacting the polyester with a polymerizable monomer, in the presence of an initiator and promoter.

(3) Reacting the mixed complex acids or the hereindefined selected fractions thereof with a saturated dibasic acid and an unsaturated alcohol or glycol or polyol or mixture of unsaturated alcohols, glycols and polyols and causing self-polymerization and/or cross-linking with a monomer in the presence of an initiator and promoter.

(4) Reacting the mixed complex acids or the hereindefined selected fractions thereof with a mixture of both saturated and unsaturated dibasic acids and a mixture of both saturated and unsaturated alcohols, glycols and polyols and causing self-polymerization and/or cross-linking with a monomer in the presence of an initiator and promoter.

Generally speaking monohydric alcohols as disclosed or described herein are used as plasticizers for the polyester compositions since as is known, monohydric alcohols when used alone are chain stoppers and do not produce high molecular weight polyesters of polymerizable nature. However, unsaturated monohydric alcohols, being di-functional in nature, can be used as the reactants in whole or in part in accordance with this invention. The self-, or homopolymerization reactions referred to herein are accomplished by prolonged standing of the monomeric polyester, by heating or by means of ultraviolet light, the latter reaction preferably being carried out in the presence of an added monomer such as styrene.

*The complex carboxylic acids*

The complex carboxylic acids or acid mixture used in accordance with this invention are prepared in accordance with the processes disclosed in copending application, Ser. No. 819,932, filed June 12, 1959 by T. W. Martinek, now abandoned, Ser. No. 79,661, filed Dec. 30, 1960 by Messrs. W. E. Kramer, L. A. Joo and R. M. Haines, now U.S. Patent 3,153,087, and Ser. No. 160,882, filed Dec. 20, 1961 by T. W. Martinek. These acids are further described in said related copending applications, Ser. No. 79,541, now U.S. Patent 3,154,507 and Ser. No. 114,637 filed June 5, 1961, and also in application Ser. No. 79,506, filed Dec. 30, 1960 by T. W. Martinek.

In accordance with said copending applications the complex carboxylic acids used to prepare the novel polyester compositions of this invention are derived by metalation, carbonation and acidification of a source of complex polynuclear aromatic sulfur-containing nuclei as represented by solvent extracts obtained in the solvent refining of mineral lubricating oils using a solvent selective for aromatic compounds. In addition hydrogenated and refined solvent extracts can be used and such related source materials as FCC recycle stock and decanted oil from FCC processes, hereinafter more fully defined, may be used.

The resulting complex carboxylic acids are mixtures of mono-, di- and polycarboxylic acids having from 1 to about 7 carboxyl groups per molecule. Through chemical analyses, characterization and study of the physical and chemical properties, by way of illustration, the complex carboxylic acids can be represented by the following formulae:

Monobasic Acids

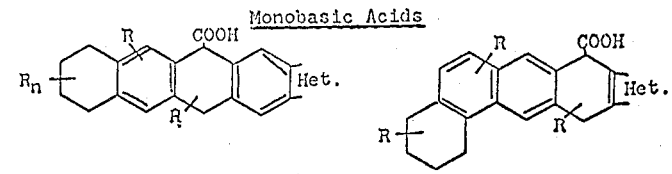

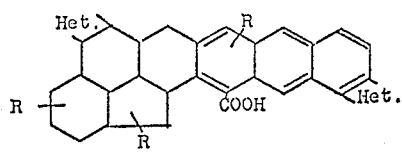

Dibasic Acids

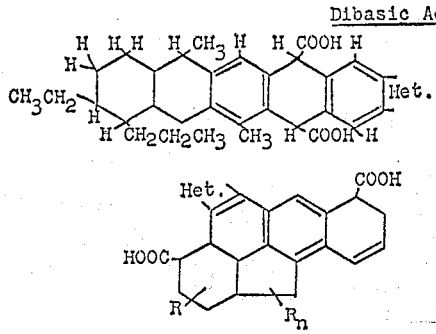

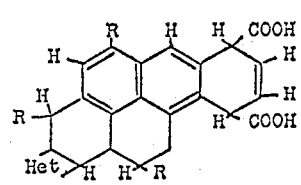

Tribasic Acids

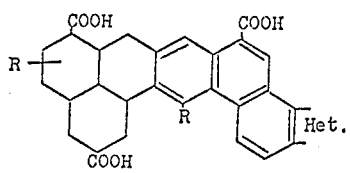
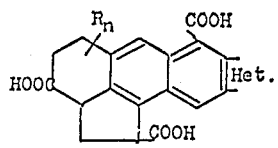

wherein "Het." illustrates one or more S-, or O-containing heterocyclic ring substituents, R is an alkyl or cycloalkyl radical having a total of 5 to 22 carbon atoms for each nucleus and $n$ has a value of 3 to 10. The molecular weight of the extract acids ranges from about 300 to 750, and the average molecular weight is about 350–475. Table I gives representative physical and chemical properties of the extract mono-, di- and polycarboxylic acids to be used in accordance with this invention.

TABLE I

Property:
- Av. mol wt. range _____ 350–475.
- Melting point _____ 60–100° C.
- Bromine No. _____ 4–24.
- Percent sulfur _____ 1.0–4.5.
- Color _____ Deep red-dark brown.
- Percent unsaponifiables _____ 2–8.

In the mixture of acids produced by metalation, carbonation, and acidification of solvent extracts, the monobasic acid derivatives constitute from 5–95% by weight, the dibasic acids constitute from 5–95% by weight and the polybasic acids, that is, those acids containing from 3 to as high as 7 carboxyl groups, make up from 0 to 20% by weight. Normally the acid mixture produced will consist of about 65% of monobasic acids and 35% of polybasic acids, which mixture can be used in accordance with this invention. In the preferred embodiment of the invention, the mixture of acids produced by metalation, carbonation, and acidification of solvent extracts from the manufacture of refined mineral lubricating oils and fractionation to separate fractions of complex acids predominating in acids containing 2 or more carboxyl groups per molecule, such as those prepared by the methods of copending applications, Ser. No. 161,355 filed Dec. 22, 1961, Ser. No. 209,741, filed July 13, 1962, Ser. No. 209,780, filed July 13, 1962, and Ser. No. 247,358, filed Dec. 26, 1962, can be used.

Since the preferred source material, namely solvent extracts from the manufacture of mineral lubricating oil, does not lend itself to economical production of the desired complex acids using the prior art methods, the preferred methods of preparation set forth in said copending applications will be described and the properties of the acids set forth as examples.

One procedure is to react about 30 parts of a petroleum fraction rich in complex polynuclear aromatics, as exemplified by solvent extract oils, with 1 to 5 parts of an alkali metal, such as sodium, potassium, cesium, lithium, and rubidium, and their mixtures and amalgams, at a temperature of about 60° to 80° C. in the presence of a reaction solvent such as dimethyl glycol ether, dimethyl ether, methylalkyl ethers, dialkyl glycol ethers, tetrahydrofuran, methyl ethyl ketone, methylal, dioxane and trimethylamine. The formation of the adduct is promoted by shearing and agitation, providing an excess of alkali metal, using a pre-formed dispersion of the alkali metal in an inert solvent, or using a pre-formed dispersion of the alkali metal in a portion or all of the solvent extract. These techniques overcome the induction period of the reaction due to impurities, including sulfur compounds present therein, which tend to coat the alkali-metal particles and prevent the reaction or prolong the induction period. A Brookfield counter-rotating stirrer may be used to give continuous shearing and expose fresh metal surfaces during the reaction. Color changes indicate the progress of the reaction.

The alkali-metal adduct thus formed is either separated or left in the unreacted oil, and the mixture is treated with excess gaseous or solid carbon dioxide at temperatures ranging from about —20° C. to —80° C., causing a discharge of the color. This forms the alkali-metal salt of the complex acid which, upon acidification with a mineral acid, such as sulfuric, nitric or hydrochloric acids, yields the desired complex, polynuclear, carboxylic acids in good yields. To illustrate, the following non-limiting examples are given.

*Example I*

One hundred gms. of extract oil No. 19 (Table III) from the preparation of 170 vis., 100 VI neutral oil, dissolved in 675 cc. of dry tetrahydrofuran, was reacted with agitation at 10° to 30° C. with 8.3 gms. of metallic sodium in the form of 5/16" cubes. After 25 minutes, adduct-formation began and a strong color change took place. The product was cooled to —60° C. while an excess of carbon dioxide gas was introduced, resulting in a discharge of the color without precipitation. The 5.1 gms. of unreacted sodium was removed, the tetrahydrofuran was vacuum-stripped therefrom, and the remaining liquid combined with ether and water-washed. Acidification of the aqueous phase and further ether washing resulted in the recovery of the free acids. About 11% of the solvent extract had reacted. The acid product (No. 1 of Table II) had an indicated average molecular weight of 686, a saponification value of 171, and a calculated equivalent weight of 328, indicating an average of 2.1 carboxyl groups per molecule.

*Example II*

One hundred gms. of extract oil No. 19 (Table III) and 675 ml. of dry tetrahydrofuran were charged to a one-liter, 3-necked flask equipped with a stirrer, thermometer, pressure-equalized drop-funnel, gas inlet with rotometer, and gas outlet. A dry nitrogen atmosphere was maintained in the flask. Approximately 100 gms. of alundum balls, 5/16" in diameter, were charged and agitation started. The solution was cooled to —20° C. and 8.3 gms. of sodium as a 20% dispersion in toluene were added. After an induction period of about 5 minutes, the solution was warmed, and at —7° C. the reaction began; in 17 minutes it was proceeding rapidly. An excess of dry carbon dioxide was added at —80° C. over a period of 78 minutes. The reaction mass was worked up as in Example I after the excess sodium was destroyed with water. About 15% of the extract oil reacted, and 22.5 gms. of extract acid were recovered having a saponification value of 241, indicating an equivalent weight of 233. The acid product contained 2.8% sulfur.

*Example III*

The process of Example II was repeated producing complex acids having a saponification value of 323, an indicated equivalent weight of 173, an indicated average molecular weight (cryoscopic) of 350, and containing 3.0% sulfur. The ratio of molecular weight to equivalent weight was 3.5 indicating a mixture containing acids with more than two carboxyl groups per molecule on the average. (Acid No. 3 of Table II.)

Example IV

The various recovered acids of application Ser. No. 819,932, illustrated in Table II therein, are further examples of mono-, di- and polycarboxylic acids to be used to prepare the polyesters of this invention.

Example V

The various carboxylic acid products described in Runs 12 through 47 of application Ser. No. 79,661 are further examples of acids that may be used.

In order to further illustrate the complexity and types of modifying acids that can be used in accordance with this invention the following tabulation is given:

TABLE II.—TYPICAL PROPERTIES OF A NUMBER OF EXAMPLE COMPLEX ACIDS (EPA)

| No. | Sap. Value | Mol. Wt. | Percent S | Br No. | Percent Unsap. | Eq. Wt. | Eqs./Mol. | Acid No. |
|---|---|---|---|---|---|---|---|---|
| 1 | 171 | 686 | | | | 328 | | |
| 3 | 323 | 600 | 3.0 | | | 173 | | |
| 4 | 287 | 750 | 1.85 | | | 195 | 3.8 | |
| 7 | 272 | 940 | 2.07 | | | 206 | 4.6 | |
| 24 | | | 1.9 | 20 | 4.4 | | | 304 |
| 31 | | | 3.2 | 22 | 6.4 | | | 242 |
| 38 | | 390 | | | 9.5 | | | 163 |
| 39 | | 375 | | | 7.4 | | | 200 |
| 40 | | 375 | | | 8.7 | | | 211 |
| 46 | | 390 | | | 4.2 | | | 197 |
| 49 | | 365 | | | 5.4 | | | 218 |
| 51 | | 455 | | | 5.5 | | | 186 |
| 53* | | 385 | | | 2.5 | | | 255 |
| 54 | | 380 | | | 6.4 | | | 216 |
| 60 | | 375 | | | 3.2 | | | 196 |
| 63 | | 345 | | | 4.0 | | | 202 |
| 71 | | | | | 4.2 | | | 233 |
| 8 | | | | | | | | 73 |
| 101 | | 405 | | | 9.0 | | | 168 |

The starting material for the reaction to prepare the complex carboxylic acids may be any complex, polynuclear, and/or heterocyclic aromatic hydrocarbon from petroleum sources. A preferred and unique source of aromatic starting material comprises petroleum fractions as herein defined, not only because the mono-, di-, and polybasic acid products therefrom have unique properties, but also because the techniques outlined herein are particularly adapted to processing these more complex and resistant source materials. Illustrating the preferred and novel starting materials is the class known as solvent extracts from the manufacture of mineral lubricating oils, which solvent extracts are rich in complex, polynuclear, aryl, alkaryl, condensed ring and heterocyclic nuclei forming the organic portion of the mono-, di-, and polybasic carboxylic acids, or their mixtures, used in preparing the polyesters of this invention. Solvent extracts from the manufacture of bright stock and neutral lubricating oils are particular examples of such fractions rich in complex aromatic compounds obtained as by-products from the solvent refining of mineral oils.

For example, a preferred source of the above-defined complex hydrocarbons comprises the solvent extracts obtained in solvent refining mineral oils, particularly lubricating oil fractions using a solvent selective for aromatic compounds. These extracts, hereinafter referred to as solvent extracts, are obtained as the extract or solvent phase when lubricating oils are refined by treatment with said selective solvent having an affinity for the aromatic compounds.

Since the general process of refining mineral lubricating oils in which solvent extracts are obtained is well known, and is related in detail in said copending applications, it is only necessary for present purposes to give some examples by way of illustration. Following are the physical characteristics of typical extract products, from lubricating oil stocks derived from various crude oils and other source hydrocarbon materials, which may be used to prepare the polyesters of this invention.

TABLE III.—SOURCES AND PHYSICAL CHARACTERISTICS OF SOLVENT EXTRACTS

| Ext. No. | Crude Source | Solvent | API Grav. | Sp. gr. at 10° F. | Vis./100° F. | Vis./130° F. | Vis./210° F. | V.I. | Pour | °F. Flash | °F. Fire | Iodine No. (Wijs) | Percent C.R. | Percent Sulfur |
|---|---|---|---|---|---|---|---|---|---|---|---|---|---|---|
| 1 | East Tex | Phenol | 11.1 | | 23,319 | 4,750 | 282 | −40 | +55 | | | | 7.2 | 2.60 |
| 2 | do | do | 15.4 | | 15,000 | | 285 | +39 | | | | | | 2.27 |
| 3 | do | do | 12.6 | | 36,410 | 4,310 | 310.1 | −1 | +80 | | | | 4.7 | 2.2 |
| 4 | do | do | 14.6 | | 19,500 | 4,305 | 313 | +27 | +90 | | | | 4.7 | 2.33 |
| 5 | do | do | 15.4 | | 32,500 | | 372 | +5 | +60 | | | | 4.13 | 2.18 |
| 6 | do | do | 13.7 | | 25,000 | 5,400 | 355 | +27 | +80 | | | | | |
| 7 | do | do | 8.6 | | 145,000 | 19,000 | 616 | 0 | +70 | | | | | |
| 8 | do | do | 10.5 | | 12,676 | 2,514 | 172.1 | −101 | +60 | | | | | 2.18 |
| 9 | Santa Fe Springs | do | 10.2 | 0.9984 | | | 371 | | +65 | 520 | 600 | 69.4 | | |
| 10 | Texas | Furfural | 13.0 | 0.9791 | | | 1,500 | | +85 | 470 | 515 | 57.4 | | |
| 11 | Penn | Chlorex | 12.2 | 0.9843 | | | 1,365 | | +85 | 560 | 630 | 71.4 | | |
| 12 | Penn | Nitrobenzene | 10.0 | 1.000 | | | 1,500 | | +75 | 555 | 640 | 60 | | |
| 13 | Mid-Cont | Propane cresol | 14.4 | 0.9699 | | | 1,500 | | +100 | 540 | 605 | 63.7 | | |
| 14 | Mid-Cont | Phenol | 13.6 | | | | 41.7 | −82 | +20 | | | | | |
| 15 | Mid-Cont | Chlorex | 13.6 | | | | 200 | −61 | +75 | | | | | |
| 16 | Mid-Cont | Phenol | 8.9 | | | | 569 | | +75 | | | | | |
| 17 | Mid-Cont | Furfural | 14.9 | | | | 50.2 | 25 | +20 | | | | | |
| 18 | East Tex | Phenol | 13.5 | .976 | 25,000 | | 341 | 17 | +65 | 530 | 610 | | 5.76 | 2.36 |
| 19 | do | do | 11.1 | | | | 61.5 | −40 | +40 | 435 | 475 | | 0.42 | 2.7 |
| 20 | do | do | 13.7 | | | | 360 | +25 | +65 | 550 | 630 | | 5.5 | 2.3 |
| 21 | do | do | 7.7 | | | | 71.1 | −128 | +35 | 420 | 495 | | 0.86 | 3.2 |
| 22 | do | do | 7.3 | | | | 796 | −76 | +65 | 520 | 610 | | 7.7 | 3.0 |
| 41 | do | do | 17.6 | | | 154 | 41 | 11 | +30 | 400 | 435 | | 0.1 | 2.0 |
| 42 | do | do | 13.7 | | 26,000 | 5,615 | 360 | +25 | +65 | 550 | 630 | 37.5 | 5.5 | 2.3 |
| 43 | do | do | 11.1 | | 1,054 | 331 | 61.5 | −56 | +40 | 435 | 475 | 40.0 | 0.4 | 2.7 |
| 44 | do | do | 7.7 | | 2,007 | 611 | 71.1 | −128 | +35 | 420 | 495 | 38.6 | 0.86 | 3.2 |
| 45 | do | do | 7.3 | 1.019 | 230,000 | 20,800 | 796 | −76 | +65 | 520 | 610 | | 7.7 | 3.0 |

Extract No. 41 was obtained in the production of 85 Vis. neutral, has an average molecular weight of 300, and contained 76.8% aromatics (by the silica gel procedure).

Extract No. 42 was obtained in the production of 150 Vis. Bright Stock, has an average molecular weight of 590, contained 86% aromatics, 14% saturates, analyzed 86.2% carbon, 11.4% hydrogen and averaged 3.3 aromatic rings per aromatic molecule.

Extract No. 43 was obtained in the production of 170 Vis. neutral, has an average molecular weight of 340, contained 84.1% aromatics, 15.9% saturates, analyzed 86.4% carbon, 10.7% hydrogen, and averaged 2.7 aromatic rings per aromatic molecule.

Extract No. 44 was obtained in the production of 200 Vis. neutral, has an average molecular weight of 340 and contained 87% aromatics and 13% saturates.

Extract No. 45 was obtained in the production of 160 Vis. Bright Stock and contained 92% aromatics and 8% saturates.

The solvent extracts from lubricating oils used as starting materials for this invention have the following general properties and characteristics:

TABLE IV

| Characteristic: | Range of value |
|---|---|
| Gravity, ° API | 7.3–18.3 |
| Gravity, sp., 60/60° F. | 0.945–1.022 |
| Viscosity SUS @ 210° F. | 40–1500 |
| Viscosity index | −128–+39 |
| Pour point (max.) ° F. | +35–+100 |
| Molecular weight, average (above 300) | 320–750 |
| Boiling point (initial) ° F. | 300–1000 |
| Boiling point (end) ° F. | 400–1200 |
| Sulfur, percent wt. (total) | 0.5–4.5 |
| Sulfur compounds percent by vol. | 20–50 |
| Aromatic compounds | 25–90 |
| Neutral aromatic hydrocarbons | 40–51 |
| Av. No. of rings/mean arom. mol. | 1.7–5.0 |

In characterizing the complex acids, and the polyester resins of this invention, the molecular weights, sulfur content and average number of aromatic rings per mean aromatic molecule are the selected criterion.

The complexity of the types of compounds present, as based on these analyses, is illustrated by the following table:

TABLE V.—ESTIMATED CHEMICAL COMPOSITION OF SOLVENT EXTRACTS NOS. 19, 21, 43 AND 44 OF TABLE III

| Type of Compound: | Approx. Percent in the Extract |
|---|---|
| Saturated hydrocarbons | 12.5 |
| Mononuclear aromatics: | |
|   Substituted benzenes | 25.0 |
| Dinuclear aromatics: | |
|   Substituted naphthalenes | 30.0 |
| Trinuclear aromatics: | |
|   Substituted phenanthrenes | 10.0 |
|   Substituted anthracenes | 5.0 |
| Tetranuclear aromatics: | |
|   Substituted chrysenes | 0.5 |
|   Substituted benzphenanthrenes | 0.2 |
|   Substituted pyrenes | 0.2 |
| Pentanuclear aromatics: | |
|   Perylene | 0.01 |
| Sulfur compounds,[1] oxygen compounds, etc. | 16.5 |

[1] Mainly heterocyclic compounds. The average mol. wt. of Extracts 19 and 21 is 340, and that of Extract 20 is 590.

Any portion of the reactive aromatic constituents in solvent extracts may be isolated therefrom, or from other sources, to be used as starting materials for the reaction in accordance with this invention. For example, solvent extracts may be distilled and selected fractions thereof used as the starting materials. The content of reactive, complex, polynuclear, aromatic compounds and heterocyclics present in solvent extracts, as illustrating the preferred source material, may vary depending on the type of solvent, the extraction process applied, and the mineral oil treated, although the general types of compounds present in the extract are not so varied. Extracts containing from about 30% to 90% of polynuclear aromatics and heterocyclics of aromatic nature represent a preferred type of starting material for economic reasons.

The solvent extract starting material may be vacuum-distilled, dewaxed and/or clay-contacted and/or hydrogenated, prior to use in preparing the complex carboxylic acids from which the selected fractions used in accordance with this invention are derived. Dewaxing can be accomplished by known methods, e.g., treatment with 45% MEK and 55% toluene as the dewaxing solvent, using temperatures in the order of −10 F., and solvent/solvent extract ratios of about 8/1. This treatment results in a dewaxed extract which has a pour point of about +5° F. and results in the removal of about 2% wax having a melting point of about 130° F. Clay-contacting can be accomplished by known methods.

The preparation of hydrogenated extracts is accomplished using known methods of hydrogenation, particularly mild hydrogenation; thus a preferred method of preparing hydrogenated extracts is to hydrogenate the distillate lube oil or residual oil before the extraction by treatment with hydrogen at 100–500 p.s.i.g. using temperatures of 530–600° F. in the presence of a molybdena-silica-alumina catalyst. This same method can be applied to the solvent extracts per se, that is after the separation from the raffinate.

Hydrogenation has been found to result in the decarboxylation of any naphthenic acids present and the production of an extract from which complex acids of enhanced properties can be obtained by metalation, carbonation, acidification and fractionation.

Other known methods of hydrogenation can be applied to the solvent extracts using such catalysts of Filtrol, cobalt-molybdate, silver-molybdate and Porocel. The characteristics of a representative hydrogenated dewaxed and clay-contacted solvent extract are ° API, 9.5; color, NPA, 7; Flash (COC), 420° F.; Fire (COC), 465° F.; Pour Point, −5° F.; Vis. at 100° F., 1075 SUS; Vis. at 210° F., 58.5 SUS; VI, −96; Neut. No. (1948), 0.05; Sulfur, 2.60 wt. percent and C.R. percent, 0.01.

The catalytic cracking of those fractions of crude petroleum oils between diesel burning oil and vacuum residuals furnishes sources of complex, high-molecular weight polynuclear aromatic and heterocyclic compounds utilizable as alternate feed materials for the preparation of the complex carboxylic acids and the novel polyester products of this invention. The Orthoflow Fuid Catalytic Cracking process of the M. W. Kellogg Co. is illustrative wherein any of the heaviest virgin gas oils that do not contain excessive heavy metal contents (which cause catalyst poisoning) are treated to fluid catalytic cracking to produce gasoline, heating oils, heavy fuel oils, and fuel gas. During the process at least two by-product streams are produced which are sources of complex polynuclear aromatic sulfur-containing compounds that can be utilized in accordance with this invention, namely, the heavy FCC cycle stock (or so-called heavy gas oil) and the decant oil. The preparation of these by-product streams is illustrated as follows. Said description is not to be construed as limiting and it is to be understood that other catalytic cracking processes can be used to produce similar by-product streams.

In a typical operation, mixed reduced crudes and several virgin gas oil streams comprising as many as 12 different feed components such as light vacuum distillates and heavy vacuum distillates, from FCC feed preparation units, solvent extracts from the preparation of neutral and light stock lubricating oils (as herein defined) and heavy virgin distillates, i.e., heavy gas oils from the distillation of crude oils, in an amount of about 23,750 b.p.s.d., are preheated by exchange and sent to the Orthoflow converter equipped with reaction, catalyst stripping, air regeneration and catalyst circulation facilities. The cracked hydrocarbon vapors, steam and inert gas are sent to the base of a fractionator tower wherein the vapors are cooled and washed free of catalyst. Sufficient cooling is accomplished by the circulation of bottoms reflux over baffles, and by downflow from the tray above, to desuperheat the entering material and to condense the slurry recycle and decanted oil. Heat recovered from the tower by the slurry reflux is used for reboiling in the recovery and catalytic polymerization sections, for preheating fresh feed and for the generation of steam in a waste heat boiler.

The slurry settler in the base of the fractionator, separated therefrom by a solid internal head, is fed by the slurry reflux pump. Decanted oil is recycled to the base of the fractionator in order to maintain a low concentration of catalyst in the slurry reflux. The net decanted oil flows through a cooler and is pumped to storage while the thickened slurry flows into the stream of recycle gas oil returning to the reactor inlet. Both a light gas oil (herein referred to as light FCC recycle stock) and a heavy gas oil (herein referred to as a heavy FCC recycle stock) are withdrawn at appropriate trays of the fractionator. The tray between the top of the scrubbing section and the heavy FCC cycle stock drawoff pan removes any entrained slurry reflux or catalyst that may carry over. Above this tray the total drawoff pan collects the heavy FCC cycle stock for removal from the tower and recycle to the reactor and as reflux to the tower. A portion of this stream after cooling, is sent to storage. Light gas oil product, lean oil, gland oil, overhead vapors and gas streams are recovered in the upper sections of the tower, and separately processed, e.g., the gas from the process is compressed and subjected to catalytic polymerization. The 23,750 b.p.s.d. of feed produces about 11,506 b.p.s.d. of gasoline, 2,381 b.p.s.d. of heating oil, 8,944 b.p.s.d. of heavy fuel oil and 1,263 b.p.s.d. of fuel gas.

In the treatment of 17,750 b.p.s.d. of fresh feed comprising distillates using a synthetic cracking catalyst at 900° F., 70% conversion at 1.5 through-put ratio (total charge divided by fresh feed) produces about 2,840 b.p.s.d. of $C_4$ hydrocarbons, 8,700 b.p.s.d. of $C_5$–400° gasoline, 4,438 b.p.s.d. of 400–600° light FCC cycle stock and 887 b.p.s.d. of decant oil is produced.

To illustrate, 17,004 b.p.s.d. of fresh feed and 4,253 b.p.s.d. of vacuum heavy gas oil from the vacuum tower (total 21,257 b.p.s.d.) is subjected to fluid catalytic cracking at about 900–880° F. using a standard cracking catalyst at a catalyst to oil ratio of about 8.4/1, and space velocity of about 2.4 to product 4,152 b.p.s.d. of light catalytic distillate, 7,516 b.p.s.d. of heavy gas oil recycle, 1,920 b.p.s.d. of decanted oil and 497 b.p.s.d. of net slurry recycle. The characteristics of the heavy cracked gas oil and decanted oil are shown in Table V. The catalyst used in the experiments was a silica-alumina fluid cracking catalyst.

The heavy cracked gas oil or heavy FCC cycle stock and decanted oil products above are illustrative of sources of complex high-molecular-weight polynuclear aromatic compounds to be used to prepare complex carboxylic acids from which the polyester resins of this invention are derived. These feed sources can be treated in a manner to increase the aromaticity or extract the complex aromatic compounds therefrom, for use in the metalation reaction, i.e., by solvent extraction with the known solvents (described herein) for this purpose.

For the FCC recycle stock this is illustrated by the 19% extract (phenol solvent) thereof, which extract had the following properties: ° API, 1.8; sulfur, 1.9 wt. percent; Br. No., 17; RI (20° C.) 1.6372 and Engler Distillation, IBP=589° F.; 90% —745° F. The use of these latter starting materials is described in copending application Ser. No. 79,661.

The results of hydrogenation of several of the solvent extracts shown in Table III to produce hydrogenated or dewaxed and hydrogenated solvent extracts as starting materials for the preparation of the complex acid mixture and subsequent ester preparation are shown in Table VI. Table VI also sets forth the range of conditions and product properties that are generally applicable in the preparation of hydrogenated solvent extracts as starting materials in the preparation of the complex acids to be used in this invention.

Without limiting the invention, the characteristics of the products of this invention as influenced by the complex acids are further disclosed as thus far evaluated. The mono-, di- and polycarboxylic acids used are mixtures of acids of the dihydronaphthalene, dihydrophenanthrene, and dihydroanthracene types, having several alkyl groups and/or cycloalkyl groups in each aromatic nucleus wherein the sum of the carbon atoms in the alkyl or naphthenic radical varies between 5 to 22. Despite the size of the acid molecules the linkages through or between the carboxyl groups are about the same as those of phthalic and terephthalic acids. A portion of the aromatic rings or condensed aromatic rings are probably further condensed with naphthenic rings to form configurations similar to the steroid ring systems. Extract acids from solvent extracts obtained in the production of bright stocks probably contain more highly condensed aromatic structures.

Another typical example of an FCC decant oil is one having an API gravity of 15.4°, IBP 375° F. and EP 995° F. at atmospheric pressure, CS vis. at 100° F. 21.00, CS

TABLE V.—PRODUCT CHARACTERISTICS

|  | Heavy FCC Recycle Stock | | Decanted Oil | |
| --- | --- | --- | --- | --- |
|  | No. 1 | No. 2 | No. 1 | No. 2 |
| Distillation: | | | | |
| ASTM D-1160 at 10 mm.: | | | | |
| IBP, ° F | 151 | 173 | 177 | 198 |
| 5% | 299 | 305 | 351 | 346 |
| 50% | 368 | 369 | 455 | 449 |
| 95% | 429 | 433 | 644 | 645 |
| EP | 484 | 481 | 680 | 663 |
| ASTM D-1160 at 760 mm.: | | | | |
| IBP, ° F | 367 | 394 | 399 | 425 |
| 5% | 549 | 556 | 611 | 605 |
| 50% | 632 | 633 | 734 | 727 |
| 95% | 734 | 740 | 949 | 950 |
| EP | 767 | 767 | 989 | 970 |
| ASTM D-158: | | | | |
| IBP, ° F | 479 | 462 |  |  |
| 50% | 616 | 618 |  |  |
| EP | 712 | 712 |  |  |
| Viscosity, CS at— | | | | |
| 100° F | 6.16 | 6.16 | [1] 22.0 | [1] 22.7 |
| 130° F | 4.04 | 4.05 | 11.73 | 11.87 |
| 210° F | 1.88 | 1.89 | 3.74 | 3.76 |
| RI at 67° C | 1.4958 | 1.4965 | 1.5525 | 1.5520 |
| Pour Point, ° F | +50 | +50 | +80 | +80 |
| Sulfur, wt. percent | 0.59 | 0.59 | 0.97 | 0.90 |
| Nitrogen, wt. percent | 0.02 | 0.02 | 0.03 | 0.03 |
| CR | 0.14 | 0.14 | 1.62 | 1.67 |
| Bromine No | 2.8 | 2.7 | 7.9 | 8.0 |
| Aniline Point, ° F | 155.0 | 154.0 | 154.0 | 153.0 |
| ° API | 26.2 | 25.7 | 14.8 | 14.6 |

[1] Extrapolated values.

TABLE VI.—HYDROGENATION OF SOLVENT EXTRACTS AND PRODUCTS

|  | Run No. | | | | | | | | | Range of Conditions and Product Properties |
| --- | --- | --- | --- | --- | --- | --- | --- | --- | --- | --- |
|  | 1 | 2 | 3 | 4 | 5 | 6 | 7 | 8 | 9 |  |
| Reaction Conditions: | | | | | | | | | | |
| Extract No | 43 | 44 | 44 | 44 | 41 | 43 | [1] 43 | 44 | [1] 44 |  |
| H/HC ratio | 2.0 | 2.0 | 2.5 | 2.5 | 1.75 | 1.03 | 2.0 | 2.0 | 2.02 | 1.0–2.5 |
| LVHSV | 2.15 | 2.05 | 2.0 | 1.95 | 2.0 | 2.0 | 2.0 | 1.97 | 2.0 | 1.9–2.5 |
| Temp., ° F | 700 | 700 | 650 | 650 | 650 | 675 | 700 | 700 | 720 | 650–720 |
| Pressure, p.s.i.g | 500 | 500 | 400 | 300 | 400 | 400 | 500 | 500 | 500 | 300–500 |
| Catalyst | [2] | [2] | [2] | [2] | [2] | [2] | [2] | [2] | [2] | [2] |
| Products: | | | | | | | | | | |
| Neut. No | 0.13 | 0.14 | 0.52 | 0.96 | 0.11 | 0.66 | 0.24 | 0.08 | 0.15 | .08–1.0 |
| Sulfur (wt. percent) | 2.4 | 3.19 | 3.07 | 3.05 | 1.75 | 2.7 | 2.6 | 2.7 | 2.7 | 1.5–3.5 |
| Grav., ° API | 12.8 | 9.4 | 8.5 | 8.8 | 18.5 | 11.8 | 12.9 | 10.1 | 9.7 | 8.0–15.0 |
| Vis. at 100° F | 663.7 | 1133 | 1457 | 1452 | 132.5 | 808.7 | 851.1 | 464 | 1058 | 450–1500 |
| V.I | −33 | −96 | −115 | −114 | −9 | −49 | −52 | −83 | −96 | −120—−9 |

[1] Dewaxed. [2] Filtrol.

vis. at 210° F. 3.66, percent S 0.870, Ramsbottom C 1.70, Mol. wt. 320, Vis. Gr. Con. 945, Br. No. 8.0. The 47 vol. percent extract from this decant oil has a specific gravity of 1.095, exhibits the same initial boiling point and end boiling point and has the following characteristics: CS vis. at 100° F. 223.5, CS vis. at 210° F. 7.80, percent S 1.44, Ramsbottom C 5.7, Vis. Gr. Con. 1.103, Br. No. 14.0, which is another species of the starting material.

Most of the sulfur is in the form of heterocyclic rings with carbon, associated with both the aromatic-type and naphthenic-type structures present. Only trace amounts of the sulfur are present as high-molecular-weight aliphatic sulfides. The nitrogen content of distilled solvent extracts is 0.01 to 0.04%. Analysis for the types of carbon linkages as percent $C_a$ (carbon atoms in aromatic configuration), percent $C_n$ (carbon atoms in naphthenic configuration) and percent $C_p$ (carbon atoms in paraffinic configuration) gives results ranging from about 30–40% $C_a$, 20–35% $C_n$, and 31–47% $C_p$ using the method of Kurtz, King, Stout, Partikian and Skrabek (Anal. Chem., 28, 1928 (1956)). They are soluble in ethyl ether, acetone, methyl ethyl ketone, tetrahydrofuran, benzene, toluene and xylene.

For purposes of this invention the complex carboxylic acids are defined as being produced by metalation, carbonation and acidification of a source of complex high-molecular-weight polynuclear aromatic and heterocyclic compounds of petroleum origin containing sulfur, said acids having molecular weights of about 350, having at least one carboxyl group and preferably having 2 to 7 carboxyl groups or containing about 35% of dibasic acids, containing about 1.0 to 4.5% by wt. of sulfur and having nuclei which have about 1.7 to 5.0 aromatic rings per mean aromatic molecule.

THE RESINS AND THEIR PREPARATION

The resins used in the compositions of this invention are thermosetting resins, and are prepared from the aforedescribed complex carboxylic acids preferably containing at least 35% by weight of di- and polybasic acids, by reaction with alcohols, glycols or polyols and dibasic acids or their anhydrides (one or both of the alcohol, glycol or dibasic acid being unsaturated) under esterification conditions, and polymerizing the resulting complex unsaturated polyesters at their double bonds or preparing interpolymerization products with a polymerizable monomer.

The resins used in the compositions of this invention are prepared using the known prior art methods of esterification and polymerization or the methods disclosed in copending applications bearing Ser. Nos. 55,123 (now U.S. Patent 3,129,192), 79,541 (now U.S. Patent 3, 154,507), 79,506 and 79,498, filed Dec. 30, 1960. A preferred class of products is prepared by reacting:

(1) Complex carboxylic acids + an unsaturated dibasic acid + a saturated glycol, or a saturated polyol, or mixture of said glycols and polyols.

(2) Complex carboxylic acids + saturated dibasic acid + an unsaturated glycol or an unsaturated polyol or mixture of said glycols and polyols.

(3) Complex carboxylic acids + an unsaturated dibasic acid + an unsaturated glycol or an unsaturated polyol or mixture of said glycols and polyols.

The alcohol reactant may contain a small amount of a saturated or unsaturated monohydric alcohol such as ethanol, a propyl alcohol, a butyl alcohol, an amyl alcohol, a hexyl alcohol, a heptyl alcohol, an octyl alcohol, lauryl alcohol, allyl alcohol, propenol-1, methylvinylcarbinol, allylcarbinol, penten-1-ol-5, citronellol and the like as a plasticizer and/or esterification agent. For the former purpose only about 1% to no more than about 5% by weight based on the total glycol reactant is used.

The reaction is conducted under esterification conditions to form monomeric esters or partially polymerized esters which are not completely cured and not thermosetting. The first-stage esters are flexible, i.e., capable of indefinite, inelastic deformation at elevated temperatures, and generally are liquid and capable of forming thermosetting resins upon treatment with heat, sources of free radicals, a dissimilar unit such as an allyl ester or a peroxide to form self-polymerized products or by use of a cross-linking agent or a curing agent, such as styrene or cumene hydroperoxide, to form a thermosetting resin of little flexibility which, once cured, or polymerized cannot be softened by heating and reformed. The polymerized or cured resins of this invention are incapable of much deformation even at high temperatures, and are infusible and insoluble. All of the reactants used are either difunctional or polyfunctional, and the degree of unsaturation is not less than 20 mol percent based on the total of said reactants exclusive of the extract polybasic acids, and preferably about 25 to 80 mol percent either in the dibasic or glycol portion of the reactants.

In the foregoing outline, the complex polycarboxylic acids can be a mixture of mono-, di-, and polycarboxylic acids as produced through metalation, carbonation and acidification of said solvent extracts or any fraction thereof which predominates in di-, or polycarboxylic acids, i.e., the acids preferably have about 10% by weight or less of monocarboxylic acids. The saturated or unsaturated dibasic acids also include their anhydrides and various mixtures thereof. Similarly, the saturated or unsaturated glycols or polyols may be in the form of mixtures or relatively pure compounds.

In reacting a complex polyfunctional mixture of reactants as contemplated by this invention under the foregoing outline, several competitive reactions take place simultaneously. The following formulae are accordingly representative and the final product, after reaction with the unsaturated monomer, i.e., styrene or the other vinyl derivatives of benzene, as the cross-linking agent, comprises a mixture of the products designated.

Thus, in one aspect of this invention monomeric diesters having the formula (1)
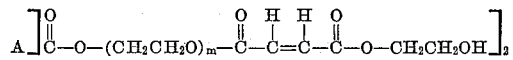

wherein A represents the complex aromatic nucleus of the novel acids, in this case dicarboxylic, and $m$ has a value of 1 to 10, are contemplated, which can be co-polymerized with styrene to form cross-linked resins.

In one embodiment of the instant invention a half ester of the formula (2)
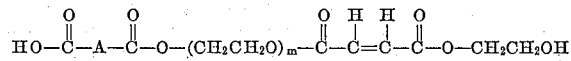

is formed wherein A is the complex nucleus of the dibasic acid derived from sulfur-containing aromatic compounds of petroleum origin, as herein described. Cross-linking with styrene or other such monomer can take place at A, or the double bond of the unsaturated dibasic acid or at any combination of these places in the molecule. If only one group is unsaturated then a linear polymer is formed which does not have the necessary thermosetting properties. Consequently since the degree of unsaturation in the complex A group is limited, for best results and the highest degree of cross-linking, there should be two or more unsaturated organic groups in the ester to be reacted with the monomer. Also since the end products will have terminal carboxyl groups, they are not as resistant to alkali as a resin formed from the esters of Formula (1).

Accordingly, in still another aspect of the invention linear polyesters formed from the complex acids, an unsaturated dibasic acid and an unsaturated glycol having the formula:

(3)
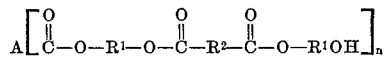

are contemplated, which can be copolymerized with styrene to form a cross-linked thermosetting resin. A in Formula (3) is the organic radical of the complex acid, and $R^1$ and $R^2$ are unsaturated and are reactive sites for polymerization and cross-linking.

From the foregoing, it is apparent that the finished products of this invention have the following polyester units:

(4)
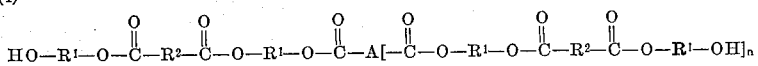
where $R^1$ is saturated, $R^2$ is an unsaturated dibasic acid, and $n$ is 1 to 6;

(5)
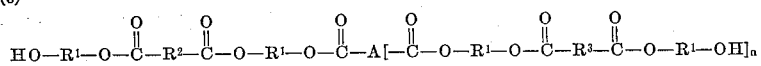
where $R^1$ is unsaturated, $R^2$ is saturated, and $n$ is 1 to 6;

(6)
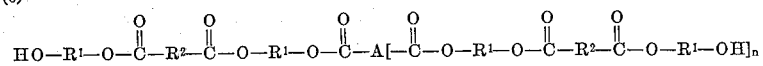
where $R^1$ and $R^2$ are both unsaturated and $n$ is 1 to 6. In the finished products, these units are cross-linked at all or part of their double bonds.

In all of the formulae infra, $R^1$ is a hydrocarbon radical containing 2 to 40 carbon atoms and may be alkyl, aryl, alkaryl, aralkyl, and cycloalkyl in configuration, and $R^2$ is a hydrocarbon radical containing 2 to 40 carbon atom and may be alkyl, aryl, alkaryl, aralkyl, polyaryl (naphthyl) and cycloalkyl in configuration. Examples of each are illustrated by the species of reactants disclosed herein.

In one aspect and feature of this invention we have found that the esters after formation can be polymerized by exposure to ultra-violet light and set without the use of conventional initiators and promoters at room temperature to hard, insoluble films. This is advantageous since the pot life is extended provided the esters are not exposed to strong light prior to use. The basis of their photosensitivity is the complex carboxylic acids derived from petroleum sources. The preparation and use of such light polymerizable esters is described infra.

The esters used as intermediates in preparing the resins used in accordance with this invention are prepared with facility by known esterification methods and conditions. It is only necessary to place the complex acids, the selected unsaturated or saturated dibasic acid, and the unsaturated or saturated glycol in a reaction vessel and to heat same to at least the melting point of the reactants, and/or to a temperature sufficient to drive off the water of esterification from the reaction mass. Any solvent which is inert with respect to the reactants and the products may be used as the solvent to remove water as the reaction proceeds. The use of a catalyst is optional. The molecular weight of the polyester is proportional to the degree of esterification. The choice and concentration of catalyst has some effect on the molecular weight.

The glycol and dibasic acid rectants used in accordance with this invention contain at least two hydroxyl and two carboxyl groups per molecule, respectively, and either or both contains at least one olefinic or acetylenic bond. Although both saturated and unsaturated monohydric alcohols are useful principally as plasticizers, their influence, particularly the former, on the desirable properties of the finished resin, though apparent is minor. Other plasticizing alcohols that may be used alone or along with the main reactants include crotyl alcohol, isocrotyl alcohol, 2-petene-1-ol, propargyl alcohol, methyl-n-amyl ethynyl-carbinol and diisopropylethynyl carbinol.

The alcohol reactants accordingly, include any of the series of monohydric unsaturated or dihydric to polyhydric alcohols containing or not containing an olefinic or acetylenic unsaturation and having from 2 to 40 carbon atoms per molecule to include both the aliphatic dihydric alcohols, the glycol series and aromatic alcohols wherein the aliphatic portion contains one or more phenyl, naphthyl or anthryl substituents such as cardinol, which is a monophenolic mixture obtained in the distillation of cashew-nut oil, consisting of about 10% of cardol, a resorcinol homolog containing a meta-substituted $C_{15}$ unsaturated chain and about 90% of a mixture of $C_{15}$ straight-chain meta-substituted phenols with different degrees of unsaturation in the side chains. The alcohol reactants fall into several groups. In one group the series

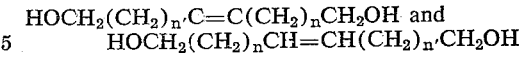

are included, wherein $n$, in each instance, has a value of 0 to 10 or more and $n'$, in each instance, has a value of 0 to 10 or more.

The saturated di- and polyhydric alcohols used to prepare the resins of this invention can be any of the series of aliphatic diols and polyols or aromatic-substituted aliphatic diols and polyols which do not contain any substituents which would interfere with the reaction. This group of saturated alcohols can be represented by the formula

wherein $R'$ is a saturated, straight chain or branched chain, aliphatic, cycloaliphatic or aryl substituted aliphatic substituent containing 2 to 40 or more carbon atoms and $y$ has a value of 2 to 10, to include the subgenus of compounds of the formula (2)     $HOR'(OR')_zOH$ wherein $R'$ is an aliphatic substituent containing 2 to 5 carbon atoms and $z$ has a value of 1 to 100. $R'$ may be $C_2$ to $C_{30}$ alkane, $C_4$ to $C_6$ cycloalkyl, i.e., cyclobutyl, cyclopentyl and cyclohexyl or methylcyclohexyl as examples, arylalkyl where the aryl group is phenyl, naphthryl or anthryl and the like, and the cycloalkane substituted alkyl wherein, in each instance, the hydroxyl groups are attached to the carbon atoms of the straight-chain portion of the molecule, to a branched-chain portion of the molecule, to carbon atoms in both the alkyl portion and cycloalkyl or aryl portions of the molecule or through alkoxy groups attaching to either the alkyl portion or alicyclic or aryl portion of the molecule.

Saturated aliphatic dihydric alcohols under Formula (1), include such examples as ethanediol-1,2(glycol); propanediol-1,3; propanediol-1,2; butanediole-1,4; butanediol-1,2; butanediol-1,3; butanediol-2,3; pentanediol-1,5; pentanediol-1,2; pentanediol-1,3; pentanediol-1,4; pentanediol-2,3; pentanediol-2,4; the hexanediols i.e., hexanediol-1,6; and hexanediol-1,2; the heptanediols i.e., heptanediol-1,7; and heptanediol-1,3; the octanediols i.e., octanediol-1,8; the nonanediols i.e, nonanediol-1,9 and nonanediol-1,8; the decanediols i.e., decanediol-1,10 and decanediol-1,9; the hendecanediols, the dodecanediols, the tridecanediols, the tetradecanediols and such other examples as pentadecanediol-1,15; hexadecanediol-1,16; heptadecanediol-1,17; octadecanediol-2,10; nonadecanediol-3,4; eicosanediol-1,20; pentacosanediol-1,2,5; hexacosanediol-2,24; heptacosanediol-3,6; octacosanediol-4,7; nonacosanediol-10,11; and tricotanediol-6,14.

Any of the foregoing genus or species of alcohols may have one or more olefinic double bonds to form the series of unsaturated dihydric and polyhydric alcohols.

Saturated aliphatic trihydric alcohols under Formula (1) include glycerol, butanetriol, 1,2,3, pentaglycerol, pentanetriol-1,2,3; pentanetriol-1,4,5; hexanetriol-1,2,3; octanetriol - 1,4,6; dodecanetriol - 1,2,3; hendecanetriol-1,6.11; tridecanetriol - 1,4,7; heptadecanetriol - 1,8,17; eicosanetriol-4,6,8 and the like. Other higher polyhydric alcohols include i-erythritol, pentaerythritol, the hexahydric alcohols such as di-mannitol, d-sorbitol, d-iditol and dulcitol and the heptahydric alcohols such as perseitol and volemitol.

The foregoing species of saturated aliphatic dihydric, trihydric, hexahydric and heptahydric alcohols may contain an aromatic, alicyclic, alkoxy or similar substituent attached to one or more of the carbon atoms in the chain. Such well known glycols of commercial manufacture as ethylene glycol, diethylene glycol, triethylene glycol, propylene glycol, dipropylene glycol, 2-ethyl-2-buty-1,3-propanediol, 2,2 - diethyl - 1,3 - propanediol, 2 - ethyl-1,3-hexanediol, hexylene glycol, 1,5-pentanediol and 1,2,6-hexanetriol, can be used.

Typical saturated branched chain primary diols from which the esters of this invention may be formed are 2-methyl-, 2,2-dimethyl-, 2-methyl-2-ethyl, or 2,2-diethylpropane-1,3-diol, 2-ethylbutane-1,4-diol, 2- or 3-ethylpentane-1,5-diol, 2,3-, 2,4-, 2,5- 2,2- or 3,3-dimethylhexane-1,6-diol, 2,2,4- or 2,4,4-trimethylhexane-1,6-diol, 2-methyl-3-ethyl- and 2-ethyl-3-methyl- or 3,3-diethylheptane-1,7-diol; 3,5,5-, 3,5,7-, 4,6,8-, 4,4,8-, 5,5,8-trimethyldecane - 1,10-diol; 4,4-dipropyldodecane-1,12-diol; 2,3-diethyl-6,6-dimethyloctane-1,8-diol; 3-butylpentane-1,5-diol; 2,2,3- or 2,2,4-trimethylpentane-1,5-diol; 3,5,5- or 2,3,5-trimethylheptane-1,7-diol. The preferred branch chain alkane primary diols are those having between about 8 and 13 carbon atoms per molecule.

Representative examples of acetylenic alcohols include propynol, 2-methyl-3-butyn-2-ol; 4-pentyn-2-ol; 4-methyl-1-pentyn-3-ol; 3,5-di-methyl-1-hexyn-3-ol; 3,6-dimethyl-1-heptyn-3-ol; 3-methyl-1-decyn-3-ol and 3-methyl-1-dodecyn-3-ol.

Typical glycol polymers that may be used include:

HO—(CH₂—CH₂—O)₂—H
HO—(CH₂—CH₂—O)₃—H
HO—(CH₂—CH₂—O)₇—H
HO—(CH₂—CH₂—O)₉—H
HO—(C₃H₆O)₃—H
HO—(C₃H₆O)₃—H
HO—(CH₂—CH₂—O—C₃H₆O)₅—H
HO—(CH₂—CH₂—O)₉—CH₃
HO—(CH₂—CH₂—O)₁₃—C₈H₁₇
HO—(CH₂—CH₂—O)₁₃—C₁₂H₂₅
HO—(CH₂—CH₂—O)₁₃—C₁₈H₃₇

The glycol, which is used, may be either an alkylene glycol or a polyalkylene glycol, said glycol containing a total of 2 to 36, preferably 4 to 18, carbon atoms. Thus, included in the invention are ethylene glycol, propylene glycol, butanediol-1,4 pentanediol-1,5; hexanediol-1,6 octylene glycol, and other straight or branched chain hydrocarbon glycols.

Examples of suitable unsaturated alcohols used as reactants or plasticizers include the following nonlimiting species, allyl alcohol, crotyl alcohol, isocrotyl alcohol, methyl vinyl carbinol, 2-pentene-1-ol, allyl carbinol, penten-1-ol-5, propargyl alcohol, methyl-n-amyl ethynylcarbinol, and diisopropylethynylcarbinol.

Other aliphatic alefinic alcohols include divinylcarbinol, 2,4-hexadiene-1-ol, 1,5-hexadiene-3-ol, 1,3-hexadiene-5-ol, 1,5-hexadiene-3,4-diol, 2-methyl-3-pentene-2-ol, 4-methyl-3-pentene-2-ol, 2-methyl-4-pentene-2-ol, 4-methyl-4-pentene-2-ol, isopropynylvinylcarbinol, 2,2-dimethyl-3-butene-1-ol, 6-heptene-1-ol, 3-heptene-2-ol, 4-heptene-3-ol, 2-heptene-4-ol, 1,5-heptadiene-4-ol, 2-methyl-4-hexene-3 - ol, 3 - methyl-5-hexene-3-ol, 5-methyl-1-hexene-5-ol, vinylisobutenylcarbinol, 2,4-dimethyl-3-pentene-2-ol, 2-octene-1-ol, trans-2-octene-1-ol, 1-octene-4-ol, 2,4,6-octatriene-1-ol, 2-methyl-6-heptene-2-ol, 6-methyl-2-heptene-6-ol, 6-methyl-3-heptene-6-ol, 2,5-dimethyl-3-hexene-2,5-diol, 8-nonene-1-ol, 4,6-dimethyl-1-heptene-4-ol, citronellol (from rose oil), rhodinol, phytol, dipropenyl glycol, 4,6-dimethyl-1,5-heptadiene-4-ol, ω-undecylenyl alcohol, oleyl alcohol, and linoelyl alcohol.

The alicyclic olefinic alcohols such as 2-cyclopentenol, 2-cyclohexenol, 1-methyl-2-cyclohexenol, 2-(1-cyclopentenyl)-ethanol, 1-vinyl-1-cyclopentanol, 1-methyl-2-cyclopentenyl-1-carbinol, methyl-1-cyclopentenylcarbinol, β-(1-cyclohexenyl)-ethanol, 1-allylcyclopentanol, ethyl-1-cyclopentenyl-carbinol, 4-n-propyl-2-cyclohexenol (cryptol), 4 - (2'-cyclopentenyl)-1-butanol, 1-methallylcyclopentanol, and trans-2-cyclohexenylcyclohexanol can be used.

The aromatic olefinic alcohols and phenols such as o-vinylphenol, cinnamyl alcohol, phenylvinyl carbinol, o-allylphenol, o-propenylphenol, phenylpropenyl carbinol, methyl-α-styrylcarbinol, methyl-β-styryl carbinol, phenylisobutylenecarbinol, 1-(α-naphthyl)-3-butene-1-ol, o-cinnamylphenol, 2-hydroxymethyl stilbene can be used.

The alicyclic and aromatic acetylenic alcohols, such as 1-ethynylcyclopentanol, 1-ethynylcyclohexanol, 1-ethynylcycloheptanol, 4 - cyclopentyl - 2 - butyne-1-ol, phenylethynylcarbinol, 1 - phenyl - 1 - butyne-3-ol, 1-phenyl-1-butyne-3-ol, 1-phenyl-1-butyne-4-ol, and diphenylethynylcarbinol, can be used.

Preferred glycols include diethylene, butylene, triethylene, dipropylene, and tripropylene glycols, hydrogenated bis-phenol-A, 1,6-hexamethylene glycol, isopropylidene bis - (phenyleneoxypropanol - 2), glycerol, pentaerythritol, etc. Less preferably, lower-molecular-weight glycols such as ethylene glycol and propylene glycol, may be used.

As seen from the foregoing examples, any hydroxyl-containing compound containing up to 40 carbon atoms may be used as the reactant and —CH=CH— may be —C≡C— (acetylenic) within the molecule. Examples of alkyl groups include ethyl, propyl, isopropyl, butyl, isobutyl, t-butyl, amyl, isoamyl, hexyl, isohexyl, heptyl, octyl, nonyl, decyl, undecyl, dodecyl, tridecyl, tetradecyl, pentadecyl, hexadecyl, heptadecyl, octadecyl, nonadecyl and eicosyl groups. The cycloparaffinic groups may be cyclopropyl, cyclobutyl, cyclopentyl, cyclohexyl, methyl cyclopentyl, and the like. Aryl and alkaryl groups include phenyl, naphthyl, anthryl, tolyl, xylyl and the like groups. Any of the foregoing may contain hydroxy groups and double bonds to form the hydroxyl-containing series of reactants.

The saturated dibasic acids and anhydrides that can be used singly or in mixtures include but are not limited to C₄ to C₂₀ dibasic acids, phthalic anhydride, isophthalic acid, tetrahydrophthalic anhydride, hexahydrophthalic anhydride, endomethylene tetrahydrophthalic anhydride, tetrachlorophthalic anhydride, hexachloroendomethylene tetrahydrophthalic acid, succinic acid, glutaric acid, adipic acid, pimelic acid, suberic acid, azelaric acid, sebasic acid, brassylic acid, tetradecanedioic acid, octadecanedioic acid, p-phenylene diacetic acid, hexahydroterephthalic acid, cyclopentamethylene dicarboxylic acid, trans-1,4-cyclohexanedioic acid and bicyclo-(3,3,0)-octane-1,4-dicarboxylic acid. A preferred group of dibasic acids comprises those in which the two carboxyl groups are separated by at least 2 and not more than 8 carbon atoms and contain from 4 to 10 corban atoms in the molecule, being of aliphatic, cycloaliphatic or aromatic nature.

Unsaturated dibasic acids which are suitable for use in preparing the unsaturated polyester resins in accordance with this invention include, but are not limited to, maleic acid or anhydride, fumaric acid, bromomaleic acid, itaconic acid, citraconic acid, mesaconic acid, chloromaleic acid, etc., that is, containing 2 to 20 carbon atoms and preferably 2 to 8 carbon atoms and being primarily aliphatic in nature.

The polymerized resin products of this invention are softer, more pliable, etc., than prior art resins prepared from saturated monohydric or dihydric alcohols and known unsaturated dicarboxylic acids. This is apparently due to the complex polynuclear group present in the polycarboxylic acids derived from solvent extracts.

The polyester intermediates are prepared by conventional esterification methods, with or without a catalyst. Any of the known esterification catalysts may be used to speed up the reaction, such as sulfuric acid, or other mineral acids, and boron trifluoride or other Lewis acids. The preferred method of ester synthesis involves refluxing about 1 mole of the complex polycarboxylic acids with about 1 to about 2.0 or as high as 5.0 moles of the dihydric olefinic alcohol. A diluent such as an inert solvent may be used when convenient for removing water as an azeotropic mixture. The reaction may be carried out at temperatures ranging from 100° to 225° C.

The polymerization reaction is also carried out by conventional methods using a small amount, less than 2%, of an initiator such as a Lewis acid or a peroxide, or a trace amount of an alkali metal. The reaction proceeds of its own accord, beginning at room temperature and gradually becoming exothermic. Means may be provided to control the exothermic reaction temperature so as not to exceed about 205° C. One procedure is to dissolve the esters in a suitable unsaturated solvent and add methyl ethyl ketone peroxide and subsequently cobalt naphthenate or dimethyl aniline slowly with agitation. The esters may be incorporated in paints or other coating materials and caused to polymerize into protective coatings by the addition of metallic driers such as those of the cobalt and lead naphthenate series. The resins are useful as laminating agents, shell-molding compounds and protective coatings.

In addition to the polymerizing catalyst disclosed herein, other suitable catalysts are acetyl peroxide, cumene hydroperoxide, azo-bis-isobutyronitrile, as well as numerous other peroxy-type catalysts known in the art.

The sealing compositions of this invention are prepared by forming the polymerizable or monomeric polyester resin as heretofore described, dissolving the resulting resin in the unsaturated, polymerizable solvent and dispersing the particulate solid in the solution, and then adding the polymerization initiator and promotor not more than a short time before the composition is poured into the joint to be sealed. After the composition has been poured into the joint and allowed to set, it is resistant against attack by chemicals, and does not deteriorate with age.

The polymerizable unsaturated solvents (cross-linking monomers) suitable for use in formulating our sealing compositions include, as a preferred group, but are not limited to, α-methyl styrene, methyl methacrylate, divinylbenzene, vinyltoluene, chlorostyrene, diallylphthalate, triallyl cyanurate, etc.

Other monomers that may be used alone or with any of the foregoing include p-nitrostyrene, fumaronitrile, maleonitrile, dimethyl fumarate, p-cyanostyrene, vinyl methyl ketone, diethyl fumarate, methacrylonitrile, acrylonitrile, methyl methacrylate, β-chloroethylacrylate, α-vinyl pyridine, m-bromostyrene, o-chlorostyrene, p-iodostyrene, m-chlorostyrene, 1-bromostyrene, p-chlorostyrene, methylacrylate, butadiene, p-dimethylaminostyrene, p-methoxystyrene, vinylidene chloride, diethyl maleate, dimethyl maleate, trichloroethylene, vinyl chloride, vinylacetate, vinyl ethyl ether, and tetrachloroethylene. The various known alkyl styrenes are included, such as o-, m-, and p-methylstyrene, the dimethyl styrenes, the trimethyl styrenes, the ethyl styrenes, the diethyl styrenes, the isopropyl styrenes, p-butyl styrene, p-heptyl styrene, m-sec-butyl styrene, the t-butyl styrenes and p-benzyl styrene.

The various chlorostyrene monomers i.e., α-chlorostyrene, o-, m-, and p-chlorostyrene, the dichlorostyrenes, the trichlorostyrenes and pentachlorostyrene can be used. Other halogen-substituted styrene monomers are o-, m-, and p-bromostyrene, α-bromostyrene, the fluorostyrenes, the trifluorostyrenes, and the like. Also the cyano-, carboxyhydroxy-, nitro-, and aminostyrenes such as o-cyanostyrene, m-hydroxystyrene, 2-carboxy-4,5-dimethoxy styrene p-nitrostyrene and o-aminostyrene can be used as the cross-linking monomer.

For most applications the cross-linking monomer is used in the range of from 1 to 2 moles to each mole of unsaturated acid or alcohol in the polyester. The inert particulate filler, for example, may be silica flour, sand, zinc oxide, iron oxide, barium sulfate, glass wool, fiber glass, powdered clay, rubber, cumarone resins, rosin, soya bean flour, cement, paraffin wax, ester gum, plaster of Paris, carbon black, asphalt, asbestos, sulfur, chalk, glue, sodium silicate, bentonite, borax, and the like. In general, the inert filler will comprise 50–80% w. of the total formulation.

Known polymerization initiators may be used, such as various peroxides, including but not limited to, the diacyl peroxides, such as benzoyl peroxide, benzoyl peroxide compounded with 50% of tricresylphosphate, lauryl peroxide, 2,4-dichlorobenzoyl peroxide compounded with dibutyl phthalate, p-chlorobenzyl peroxide, p-chlorobenzoyl peroxide compounded with 50% tricresyl phosphate, the diacyl acid peroxides, such as succinic acid peroxide, the ketone peroxides, such as methyl ethyl ketone peroxide, methyl ethyl ketone peroxide compounded in dimethyl phthalate, the aldehyde peroxides, such as hydroxyheptyl peroxide, the alkyl peroxides, including di-t-butyldiperphthalate, t-butyl perbenzoate, the alkyl hydroperoxides including t-butylhydroperoxide and others including caprylyl peroxide in mineral oil, acetyl peroxide, cyclohexanone peroxide, cyclohexanone peroxide with dibutyl phthalate, t-butyl peroxyisobutyrate in benzene, cumene hydroperoxide, pinane hydroperoxide, p-menthane hydroperoxide, t-butyl peracetate in benzene, dicumyl peroxide 2,5-dimethylhexane-2,5-dihydroperoxide and di-t-butyl peroxide.

Other free radical initiators that can be used are acetyl benzoyl peroxide, peracetic acid isopropyl percarbonate, cyclohexyl hydroperoxide, methylamyl ketone peroxide, lauroyl peroxide (technical grade), methyl cyclohexyl hydroperoxide, t-butyl permaleic acid, t-butyl perphthalic acid, p-chlorobenzoyl peroxide, di-t-butyl peroxide and dibenzal diperoxide.

The temperature at which the curing process is to be carried out, as is known in the art, becomes the primary consideration in selecting any of the foregoing initiators. Caprylyl peroxide, having an active oxygen percent of 5.2 (equivalent to the active oxygen concentration of 1% benzoyl peroxide) will have a 15 minute gelling time at 142° F. and a 5 minute gelling time at 167° F. in a standard resin composition comprising 1.0 mole of complex carboxylic acids, 1.0 mole of diethylene glycol and 1.0 mole of maleic anhydride. Di-t-butyl peroxide with a 10.8% active oxygen content will have a 15 minute gelling time at 228° F. and a 5 minute gelling time at 253° F. in substantially the same resin composition. For any given resin-catalyst or initiator combination there is an optimum temperature at which the resin can utilize all of the free radicals formed by the peroxide decomposed at that temperature. Above that temperature, peroxide may be wasted, while below it too much time is required to obtain a complete cure.

Polymerization promoters are added to the resin system to speed up the decomposition of the initiator into free radicals. These are generally specific to the types of initiators used, i.e., those which are most effective with peroxide initiators, those most effective with hydroperoxide initiators and those which function for both, as is known in this art. Thus the metallic salts such as cobalt naphthenate and manganese naphthenate are used with hydroperoxides such as methyl ethyl ketone peroxide and cumene hydroperoxide. The aniline promoters such as, diethyl aniline and dimethyl aniline are used with peroxides such as benzoyl peroxides, the quaternary amines are used with hydroperoxides, and, mercaptans, such as dodecyl mercaptan and mercapto ethanol are used with the hydroperoxides for best results. Any of these promoters are suitable for incorporation into the formulations of this invention to cause setting after the composition has been poured. The setting time can be varied to some extent by varying the amounts of initiator and promoter.

In order to demonstrate this aspect of the invention. the following examples are given:

Example VI

A 249-g. portion (1 acid equivalent) of "extract dibasic acid" (225 acid number), 147 g. (3 acid equivalents) of maleic anhydride, 231 g. (2.2 g.-moles) of diethylene glycol, and 330 g. (2.2 g.-moles) of triethylene glycol are charged to a resin kettle with 50 ml. of toluene (to form an azeotrope). The mixture is esterified at 400° F., under a nitrogen blanket (to prevent polymerization of the maleic anhydride) until the acid number of the resin has diminished to about 25. Then the toluene is distilled from the mixture, and the product is cooled.

Thereafter, 250 g. of styrene are added to 750 g. of the resin, along with 750 g. of silica, 7.5 g. of 6% cobalt naphthenate solution and 3.8 g. of dimethylaniline (promoter), and finally, with 5 g. of methyl ethyl ketone peroxide and 5 g. of benzoyl peroxide paste (initiator). The resulting mixture is stirred and poured into the bell-joint between two lengths of clay pipe. The fluid mass quickly hardens into a solid, sealing mass.

The effects of many variables have been determined experimentally, as shown in the accompanying tables. Table VII shows that the hardness and tensile strength of the set composition are reduced as the amount of "extract dibasic acids" is increased with respect to the amount of unsaturated dibasic acid. Table VIII shows that the tensile strength and hardness are also reduced as the molecular weight of the glycol is increased. Table IX shows that a mixture of glycols can be used, but again, the higher-molecular-weight glycol results in lower tensile strength and hardness. Table X shows that higher temperatures and longer reaction times during the esterification step increase hardness and tensile strength. Table XI shows that the tensile strength and hardness are inversely proportional to the solvent/polyester ratio. Table XII shows that tensile strength is directly proportional to the amount of silica flour in the composition, within the range of 50–65%, or to the amount of glass wool. Table X lists an effective initiator and promoter combination, and also shows that the tensile strength is increased by increasing the amount of initiator-promoter combination. All tensile strengths and hardnesses were determined after the compositions had cured at room conditions for 7 days.

TABLE VII.—EFFECT OF EXTRACT DIBASIC ACID/DIBASIC ACID RATIO

| Maleic Anhydride | Extract Dibasic Acid | Tensile Strength (p.s.i.) | Hardness (Shore, $A_2$) |
|---|---|---|---|
| [1] 3 | [1] 1 | 440 | 90 |
| [1] 3 | [1] 2 | 250 | 66 |

[1] Equivalents, all other factors were the same in both cases.

TABLE VIII.—EFFECT OF GLYCOL TYPE

| Glycol | Tensile Strength (p.s.i.) | Hardness (Shore, $A_2$) | Viscosity of 65% Solution in Styrene (poise) |
|---|---|---|---|
| Diethylene | 1,600 | ≥100 | 2.25 |
| Triethylene | 400 | 87 | 1.80 |

TABLE IX.—EFFECT OF GLYCOL MIXTURES

| Diethylene Glycol | Triethylene Glycol | Tensile Strength (p.s.i.) | Hardness (Shore, $A_2$) |
|---|---|---|---|
| 1 part | 1 part | 600 | 92 |
| 1 part | 3 parts | 450 | 89 |

TABLE X.—EFFECT OF ESTERIFICATION CONDITIONS

| Temperature (° F.) | Time (min.) | Tensile Strength (p.s.i.) | Hardness (Shore, $A_2$) |
|---|---|---|---|
| 360 | 280 | 380 | 85 |
| 400 | 280 | 500 | 92 |
| 400 | 240 | 400 | 90 |

TABLE XI.—EFFECT OF SOLVENT CONCENTRATION

| Styrene Content (percent) | Tensile Strength (p.s.i.) | Hardness (Shore, $A_2$) | Viscosity (poise) |
|---|---|---|---|
| 20 | 600 | 94 | 22.0 |
| 30 | 500 | 90 | 4.2 |
| 40 | 410 | 86 | 0.75 |

TABLE XII.—EFFECT OF TYPE AND CONCENTRATION OF INERT FILLER

| Percent Silica Flour in Styrenated Resin | Percent Glass Wool in Styrenated Resin | Tensile Strength (p.s.i.) | Hardness (Shore, $A_2$) | Viscosity (poise) |
|---|---|---|---|---|
| 50 | 1 | 400 | 89 | 13.0 |
| 50 | 4 | 850 | 89 | 13.0 |
| 62.5 | 1 | 900 | 95 | 72.0 |

TABLE XIII.—EFFECT OF CURING-AGENT TYPE AND CONCENTRATION

In testing the effects of other variables, the following initiator-promoter system was used, the concentrations being based on the filled styrenated resin:

| | Percent |
|---|---|
| Benzoyl peroxide | 0.5 |
| MEK peroxide | 0.5 |
| Cobalt naphthenate | 0.75 |
| Dimethyl aniline | 0.38 |

The gel times of the resins in which these compounds were included at these concentrations varied within the range of 4–10 minutes. When the concentrations were changed, the properties of the set resin (at the end of 7 days of curing) were changed as follows:

TABLE XIV

| Initiator-Promoter Amount | Tensile Strength (p.s.i.) | Hardness (Shore, $A_2$) |
|---|---|---|
| Standard | 500 | 91 |
| 4x Standard | 1,100 | 93 |

In formulating the encapsulating compositions of this invention, the unsaturated polyester resins described herein are dissolved in a polymerizable unsaturated solvent, the inorganic filler is added, along with small amounts of one or more polymerization initiators and one or more polymerization promoters, and the fluid is poured into the housing to submerge the electrical assembly. After the composition is set, the encapsulated assembly is resistant against elevated temperatures and contact with chemicals, and does not deteriorate with age.

The compositions of the polyester resin and the encapsulating composition are not critical, and can be varied over wide ranges to attain desired characteristics. In general, softer resins and encapsulating compositions can be prepared by:

(1) using greater amounts of high-molecular-weight glycols;
(2) increasing the amount of "extract acid," and correspondingly decreasing the amount of unsaturated dibasic acid; or
(3) increasing the amount of polymerizable unsaturated solvent;

Harder compositions can be prepared by:

(1) increasing the amount of unsaturated dibasic acid, and decreasing the amount of "extract acid";
(2) using the lower-molecular-weight glycols, such as ethylene glycol and propylene glycol;
(3) incorporating small amounts (up to about 10%) of polyols, such as glycerine and pentaerythritol;
(4) using small amounts (up to about 10%) of poly-unsaturates in the solvent; and/or
(5) increasing the amount of filler.

The following example is illustrative:

Example VII

A 300-g. portion (1 acid equivalent) of maleic anhydride, 250 g. (3 acid equivalents) of "extract acid" (225 acid number), 231 g. (2.2 g. moles) of diethylene glycol, and 330 g. (2.2 g.-moles) of triethylene glycol are charged to a resin kettle with 50 ml. of toluene (to form an azeotrope). The mixture is esterified at 400° F. under a nitrogen blanket to prevent polymerization of the maleic anhydride, until the acid number of the resin has diminished to about 25. Then the toluene is distilled from the mixture, and the mixture is cooled.

Thereafter, 250 g. of styrene are added to 750 g. of the resin, along with 750 g. of silica, 7.5 g. of 6% cobalt naphthenate solution and 3.8 g. of dimethylaniline (promoter), and finally, with 5 g. of methylethyl ketone peroxide and 5 g. of benzoyl peroxide paste (initiator). The resulting mixture is stirred and poured into a ballast box containing the electrical components of a starter for fluorescent lights. The fluid quickly hardens into a solid protective mass around the electrical components.

Additional resin compositions of this invention, including appropriate cross-linking monomers, initiators and promoters for sealing, casting and molding therewith are shown in Table XV.

In one aspect or feature of this invention the unsaturated polyesters formed from the complex carboxylic acids are photosensitive and can be set or cross-linked with the monomer without the use of conventional initiators and promoters at room temperature to hard, insoluble resins. These products are particularly adapted to form coatings and films. This is illustrated by the following examples.

Example VIII 249 gram portion (1 acid equivalent of complex carboxylic acids prepared by the metalation, carbonation and acidification of phenol extract from the phenol extraction of mineral lubricating oil), having an acid number of 225, 150 grams (3 acid equivalents) of maleic anhydride, 231 grams (2.2 gram-moles) of diethylene glycol and 330 grams (2.2 gram-moles) of triethylene glycol were charged to a resin kettle with 50 mls. of toluene (to form an azeotrope). The mixture was esterified at 400° F. under an atmosphere of nitrogen, to prevent polymerization of the maleic anhydride, until the acid number of the resin was 25. The toluene was then distilled from the mixture and the solvent-stripped product was allowed to cool. Thereafter 300 grams of styrene was added to 750 grams of the polyester resin. Films cast from this resin (1 mil thick) on tin plate and wood pieces cured within 20 minutes to a hard, insoluble film when exposed to an ultra-violet ray lamp. Similar films cast on metal and wooden surfaces are cured by sunlight.

Example IX

The procedure set forth in Example VIII is repeated using fumaric acid in place of maleic anhydride and methyl methacrylate in place of styrene to form photosensitive polyester compositions in accordance with this invention.

The photosensitive polyesters are prepared in the same manner as the catalyzed polyesters except that the conventional initiators and promoters are omitted in the processing. Various proportions of diol, saturated dibasic acid and unsaturated dibasic acids or the other reactants disclosed supra are used to form the unsaturated photosensitive polyesters. After formation of the initial polyester product it is usually diluted while warm or even at room temperature with the unsaturated solvent or monomer in a proportion of about 20% to 40% of the monomer based on the total weight of the mixture. The absence of initiators or promoters obviates the problem of short pot life which has been associated with conventional polyester resins for use as coatings. This factor of pot life has militated against the use of polyester resins in furniture enamels and varnishes or as protective films over metals despite the obvious advantages of polyester resins over conventional alkyds, varnishes, enamels and lacquers used for these applications.

TABLE XV.—RESIN COMPOSITIONS OF THIS INVENTION

| Comp. No. | Ingredients (in equivalents) | | | | | |
|---|---|---|---|---|---|---|
| | Complex Carboxylic Acid | Dibasic Acid | Glycol | Cross-linking Monomer | Initiator | Promoter |
| 1 | From Ex. I (2.0) | Maleic anhydride (4.0) | DEG (6.5) | Methyl methacrylate | Cumene hydroperoxide | Manganese naphthenate. |
| 2 | From Ex. II (4.5) | Fumaric acid (4.5) | TEG (10.0) | Styrene | Benzoyl peroxide | Diethylaniline. |
| 3 | Acid No. 1 of Table II (4.5) | Chloromaleic (4.5) | DPG (10.1) | Vinyl toluene | MEK peroxide | Dodecyl mercaptan. |
| 4 | Acid No. 49 of Table II (5.0) | Citraconic acid (5.0) | Glycerol (11.2) | α-methyl styrene | do | Cobalt naphthenate. |
| 5 | Acid No. 53 of Table II (6.0) | Succinic acid (4.0) | Allyl alcohol (11.3) | Dichlorostyrene | Cobalt naphthenate plus MEK peroxide. | Dimethylaniline plus benzoyl peroxide. |
| 6 | Acid No. 60 of Table II (2.0) | Sebacic acid (4.0) | Crotyl alcohol (6.7) | Divinyl benzene | | |
| 7 | Acid No. 63 of Table II (3.0) | Pimelic acid (0.6) | Citronellol (3.9) | | | |
| 8 | Acid No. 71 of Table II (2.0) | Azelaric acid (4.5) | Oleyl alcohol (7.2) | | | |
| 9 | Acid No. 101 of Table II (6.0) | Succinic acid (1.0) | Cinnamyl alcohol (8.0) | | | |

Now, in accordance with this invention a light-cured polyester resin is provided which eliminates many of these problems because they can be cured at room temperature merely by exposure to ultra-violet light. This makes it possible to coat wood, metal parts and heat sensitive materials with polyester resins and obtain cured finishes at room temperature in a short period of time. For example, a furniture cabinet is sprayed with a light-sensitive polyester resin of this invention and carried on a conveyor through a chamber containing a battery of ultra-violet lamps. The strong light will cure the resin films to a hard, mar-proof, solvent-resistant finish. Various colored pigments and other ingredients known in this art can be added before curing to obtain desired finished and surface conditions. Although any of the various reactants previously described can be used to prepare the photosensitive polyester resins, that is, the complex carboxylic acids derived by metalation, carbonation and acidification, an unsaturated dibasic acid and a glycol or a saturated dibasic acid and a glycol or a saturated dibasic acid and an unsaturated glycol or polyol with any of the monomers disclosed, in a preferred embodiment an unsaturated dibasic acid of the group consisting of maleic acid or anhydride, fumaric acid, itaconic acid, citraconic acid or anhydride or mixtures of same is used with such diols as ethylene, propylene, diethylene, triethylene or butylene glycols or their mixtures and hydrogenated bisphenol-A or 1,6-hexylene glycol. The monomer is preferably styrene, methyl methacrylate, divinylbenzene or diallyl phthalate, the latter two monomers generally being used as part of the monomer solvent added.

In one aspect of this invention the polyesters are formed from complex carboxylic acids, derived from polynuclear aromatic and heterocyclic compounds of petroleum origin, which are primarily dibasic or contain a predominance of complex acids having 2 to 7 carboxyl groups per molecule or a predominance of complex carboxylic acids having 2 to 4 carboxyl groups. Although mixtures of the complex acids as formed in the metalation, carbonation and acidification reactions form polyester resins of improved properties, certain further improvements are obtained by excluding the monobasic acids, such as flexibility of the films, ease of control of the properties of the resins by variations in reactant proportions and shortened setting time. The preparation of such selected fractions of the acids can be accomplished by the processes described in copending applications:

Ser. No. 161,355, Dec. 22, 1961, L. A. Joo et al.; Ser. No. 209,741, July 13, 1962, L. A. Joo; Ser. No. 209,780, July 13, 1962, L. A. Joo; Ser. No. 247,358, Dec. 26, 1962, L. A. Joo et al.

In accordance wtih application Ser. No. 161,355 fractions of the complex carboxylic acids are separated in accordance with their acid numbers and the number of carboxyl groups per molecule by (1) dissolving the salts of the mixed acids, such as the sodium salts, in a first solvent, such as water, in which the free acids are at most only sparingly soluble; (2) adding a small amount of an acid, such as HCl, sufficiently strong to decompose the salts and liberate a portion of the desired acids and extracting the liberated acids from the mixture using a second solvent, such as toluene or ether, which is immiscible with the first solvent; (3) adding another small amount of mineral acid to the remaining salt solution; (4) again extracting the acids thus liberated with said second solvent, and continuing this cyclic acidification and extraction until the first solvent is substantially free of the desired acids and their salts. Such treatment produces initial fractions of acids having acid numbers of 77 to 122 having one or less than one carboxyl group per molecule and subsequent fractions having acid numbers of 125 to 400 and containing, as desired, about 1 to 3 carboxyl groups per molecule. All of the acids so separated have molecular weights in the range of about 385 to 424. An illustrative dibasic acid fraction is a fraction, of said copending case, having an acid number of 298, a mol. wt. of 400 and containing about 2.10 COOH/mol. Other fractions disclosed in said copending application Ser. No. 161,355 can be used in preparing the resins of this invention.

Similarly the fractionation process disclosed in application Ser. No. 209,741 can be used to exclude the monobasic acids by (1) dissolving the free acid mixture in a first solvent (toluene) in which the mixture is readily soluble; (2) adding a small amount of an aliphatic solvent (n-heptane) to precipitate or liberate a portion of the desired acids; (3) filtering the precipitated acids from the mixture; (4) adding another small amount of said aliphatic solvent to the remaining acid mixture; (5) again filtering the acids thus liberated; and (6) continuing this cyclic precipitation and filtration until the solute consists primarily of monobasic acids and the desired di-, tri-, and tetracarboxylic acids have been separated. In this process the precipitated phases contain the predominantly dibasic or higher acids while the filtrate contains the predominantly monobasic acids. A typical acid from this process is one having an acid number of 300, a mol. wt. of 435 and containing about 2.33 COOH/molecule.

In copending application Ser. No. 209,780 selected fractions of the complex carboxylic acids are obtained by (1) dissolving a given amount of the complex acid mixture in a critical amount of a first aromatic solvent other than benzene, such as toluene, in which the free acids are fairly soluble; (2) adding a small and preselected amount of a second aromatic solvent, such as toluene or xylene, which causes the precipitation of the high acid-number polybasic acids as the first portion of desired acids: (3) separating the liberated acids from the resulting mixture; (4) adding another selected or small amount of the second aromatic solvent to the remaining solution; (5) again separating the acids thus liberated or precipitated; and (6) continuing this cyclic addition of incremental amounts of said second solvent and subsequent separations until the first solvent (which may be the same as the second solvent) is substantially free of desired acids.

In accordance with application Ser. No. 209,780 an example acid fraction is the third fraction separated (from a charge having an acid No. of 218, and a mol. wt. of 410), having an acid No. of 288, a mol. st. of 410 and 2.10 COOH/mol.

The lower phase fractions of the three phase process of application Ser. No. 247,358, being predominantly di- and tri-basic acids and having acid numbers of about 245 to 309, are further examples of selected fractions of the complex carboxylic acids that can be used to prepare the polyesters of this invention. In this process the mixed acids separated from the acidification step are dissolved in an alkali (i.e., NaOH) and an ether solvent or THF. A saturated salt solution, such as NaCl, is added and the mixture is shaken and allowed to settle to form three phases. The upper phase contains unsaponifiables, the middle phase contains substantially monobasic acids and the lower phase the dibasic acids and higher. When THF is used only, two phases result with the lower phase containing the desired di-, tri-, and higher polybasic acids.

The predominantly dibasic acid fractions of complex carboxylic acids derived from solvent extracts and the other starting materials disclosed herein, have acid numbers ranging from about 250 to 330, contain about 1.0 to 4.5 wt. percent of sulfur and have an average of about 1.7 to 5.0 aromatic rings per mean aromatic molecule which properties distinguish same over previous acids used to prepare polyester resins. A relatively pure dibasic acid fraction will have an acid number of about 280. Monomeric esters, polyester resins prepared from such selected fractions and compositions containing same are contemplated by this invention.

Having thus described this invention, the only limitations attaching thereto appear in the appended claims.

The embodiments of this invention in which an exclusive property or privilege is claimed are defined as follows:

1. The polymerized polyester resin formed by the reaction of substantially stoichiometric amounts of
   (1) complex polynuclear aromatic carboxylic acids derived from solvent extracts obtained in the solvent refining of mineral lubricating oils with a solvent selective for aromatic compounds by metalation of said solvent extracts to form the alkali metal adduct, carbonation of said adduct with carbon dioxide to form the corresponding alkali metal salt of the carboxylic acid and acidification of said salt to form a free carboxylic acid mixture comprising about 65% monobasic acids and characterized by being complex, heterocyclic-containing compounds having an average molecular weight of about 350 to 475, containing about 1.0 to 4.5 wt. percent of sulfur and having an average of about 1.7 to 5.0 aromatic rings per mean aromatic molecule,
   (2) a hydroxyl-containing compound of the group consisting of aliphatic alcohols, cycloaliphatic alcohols, olefinic alcohols, acetylenic alcohols, phenols, aromatic olefinic alcohols, glycol polymers, containing 2 to 40 carbon atoms and 2 to 10 hydroxyl groups per molecule, and mixtures thereof and
   (3) a $C_2$ to $C_{20}$ dibasic acid of the group consisting of aromatic dibasic acids, aliphatic dibasic acids, olefinic dibasic acids, cycloaliphatic dibasic acids and mixtures thereof
   wherein at least one of said reactants other than said complex polynuclear aromatic carboxylic acids, contains an ethylenic unsaturation, under esterification conditions at a temperature of about 100 to 205° C. sufficient to remove water of esterification formed during the reaction to form the unsaturated polyester and thereafter polymerizing said unsaturated polyester in the presence of ultraviolet light to form a hard, insoluble resin.

2. The product in accordance with claim 1 in which the unsaturated polyester is polymerized by reaction with about 1 to 2 moles of an ethylenically unsaturated monomer for each mole of ethylenically unsaturated reactant in said unsaturated polyester.

3. The product in accordance with claim 2 in which said unsaturated monomer is a member of the group consisting of α-methyl styrene, methyl methacrylate, divinylbenzene, vinyltoluene, chlorostyrene, diallylphthalate and triallylcyanurate.

References Cited

UNITED STATES PATENTS

| | | | |
|---|---|---|---|
| 2,965,587 | 12/1960 | Rickert | 260—75 XR |
| 2,970,164 | 1/1961 | Jezl | 260—75 XR |
| 3,042,548 | 7/1962 | Aikens | 260—40 XR |
| 3,128,302 | 4/1964 | Matinek | 260—75 XR |
| 3,129,192 | 4/1964 | Kramer et al. | 260—22 |

MORRIS LIEBMAN, *Primary Examiner.*

A. H. KOECKERT, J. FROME, *Assistant Examiners.*